United States Patent Office 2,900,426
Patented Aug. 18, 1959

2,900,426
PROCESS FOR THE PREPARATION OF AZULENES

Karl Ziegler, Mulheim (Ruhr), and Klaus Hafner, Marburg (Lahn), Germany; said Hafner assignor to said Ziegler No Drawing. Application December 8, 1958
Serial No. 778,626

Claims priority, application Germany December 20, 1956

8 Claims. (Cl. 260—666)

This invention relates to a process for the preparation of azulenes, and is an improvement in the inventions described in our prior Patents Nos. 2,766,304 and 2,805,266.

The present application is a continuation-in-part application of application Serial No. 703,280, filed December 17, 1957, now abandoned, claiming the priority of the corresponding German application filed December 20, 1956.

Patent No. 2,766,304 describes and claims a process for the preparation of azulenes, wherein a compound of the following general formula:

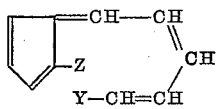

wherein Z stands for hydrogen, Y represents a member of the group consisting of the halogens, the hydroxy group, the alkoxy groups and the substituted and unsubstituted amino groups and the hydrogen atoms otherwise present in the molecule may be substituted by monovalent radicals and the tautomers of such compounds are subjected to heating in a reaction chamber to a temperature of about 100–300° C.

In a preferred embodiment of the process of Patent No. 2,766,304 the azulenes are prepared by condensing a cyclopentadiene, which is substituted in at least one ortho-position to the CH$_2$-group by hydrogen, with a compound of the general formula $$O=CH-CH=CH-CH=CH-Y \qquad II$$

wherein Y represents a member of the group consisting of the halogens the hydroxy group, the alkoxy groups and the substituted and unsubstituted amino groups and the hydrogen atoms being present in the molecule may be substituted by monovalent radicals, and subjecting the pentadienylidene-cyclopentadiene-derivative thus obtained to a temperature of about 100–300° C.

Patent No. 2,805,266 provides an improvement of the process of Patent No. 2,766,304 wherein a pyridinium salt is reacted with a substance selected from the group consisting of alkali and alkaline earth metal compounds of a cyclopentadiene which is substituted by hydrogen in at least one position adjacent to the CH$_2$-group in the presence of a solvent so as to form an intermediate reaction product, and the thus formed intermediate reaction product is subjected to a temperature of about 100–300° C. so as to convert said intermediate reaction product to an azulene.

It has now been found that the alkali metal and the alkaline earth metal compounds of the cyclopentadienes which are substituted by hydrogen in at least one position adjacent to the CH$_2$-group, can be reacted very easily with pyrylium salts to form 5-hydroxy- or 5-alkoxy-pentadiene-2,4-ylidene fulvenes, and the fulvenes obtained in this manner are able to form the corresponding azulenes in a surprisingly simple manner with splitting off of water or alcohol. The azulenes are generally formed even at room temperature from the 5-hydroxy- or 5-alkoxy-pentadiene-2,4-ylidene fulvenes, but preferably at a slightly elevated temperature, for example at about 60–70°. One may use higher temperatures, but this does not offer any additional advantage in general. The broad range of the reaction temperatures is between about 0° C. to about 100° C., and the preferred range is between about 40° C. to about 100° C. The yields are about 40–60% of the theoretical.

As compared with the processes disclosed in the prior Patents Nos. 2,766,304 and 2,805,266, the process of the present invention provides the substantial advantage that the azulene ring-closing reaction can take place at temperatures below 100° C., whereas it is necessary to work at substantially higher temperatures and in the presence of high-boiling organic solvents when the processes of the said prior patents are used.

In one particularly simple form of the process of the present invention, a solution of an alkali metal or an alkaline earth metal salt of a cyclopentadiene, for example a solution of sodium cyclopentadiene in anhydrous tetrahydrofurane, is added to a suspension of a pyrylium salt, for example a suspension of 2,4,6-trimethyl pyrylium perchlorate in anhydrous tetrahydrofurane. The two compounds immediately react together in an exothermic reaction with the formation of for example sodium perchlorate and 5-hydroxy-1,3,5-trimethyl-pentadiene-2,4-ylidene-cyclopentadiene. The reaction of this fulvene then continues with intramolecular splitting off of water and ring-closure to form 4,6,8-trimethyl azulene (III)

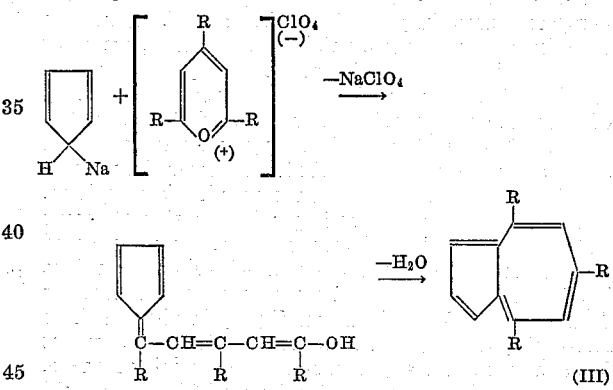

(III)

The reaction takes place more quickly and with higher yields if the operation takes place in boiling tetrahydrofurane.

As pyrylium salt components preferably such pyrylium salts are used as are substituted in the pyrylium ring system by one or more alkyl-, aryl- and/or alkoxy-groups. The said substituents, for instance the aryl-group, may be substituted by one or more substituents such as the alkoxy- or the dialkylamino-groups or the halogen-atoms. The pyrylium salts of perchloric acid, and also of fluoboric acid, have proved to be particularly advantageous and these salts are moreover very readily available.

Indene is an example of a substituted cyclopentadiene within the scope of the present invention. It is suitable for use as initial component in the same way as the cyclopentadienes. Furthermore, any substituted cyclopentadienes can be used in the form of their metal compounds, provided that two juxtaposed carbon atoms of the 5-membered ring are unsubstituted. Instead of the metal compounds of the cyclopentadienes, it is also possible to use the free cyclopentadienes if the operation takes place in the presence of alkali metal alcoholates.

Tetrahydrofurane and ethylene glycol dimethyl ether are especially suitable solvents for the reactants.

By using the process of the present invention, it is possible quickly and simply to prepare azulenes in rela-

Example 1

A solution of 8.8 g. of sodium cyclopentadiene in 65 ccm. of absolute tetrahydrofurane is slowly added dropwise while stirring and with exclusion of air and moisture to a suspension of 22.3 g. of 2,4,6-trimethyl pyrylium perchlorate (prepared according to O. Diels, Ber. d. Deutschen Chemischen Gesellschaft, vol. 60, 721 (1927)), in 150 ccm. of absolute tetrahydrofurane. The reaction mixture becomes heated and gradually changes to a reddish violet color. After heating for 1 hour to about 60° C., 200 ccm. of water are added to the violet tetrahydrofurane solution and this mixture is submitted to extraction by shaking several times with hexane. The combined hexane extracts are washed with water and they are then dried over calcium chloride. The hexane solution is thereafter passed through an aluminium oxide column and then the extract is concentrated by evaporation. The violet crystals which remain as residue can be sublimed in vacuo or recrystallized from ethanol for the purposes of further purification. 4,6,8-trimethyl azulene is obtained in a yield of 67% of the theoretical. Melting point: 81–82° C. Melting point of the trinitrobenzolate: 173–174° C. Molecular weight: found 167, calculated 170. The 4,6,8-trimethyl azulene shows the following absorption maxima in its spectrum in the visible range: 649 (172), 588 (397), 565 (435), 547 (463) m$\mu$ ($\epsilon$).

Example 2

35.5 g. of 2-methyl-4,6-diphenyl pyrylium perchlorate (prepared according to O. Diels, Ber. d. Deutschen Chemischen Gesellschaft, vol. 60, 721 (1927)), are finely suspended in 150 ccm. of absolute tetrahydrofurane. A solution of 8.8 g. of sodium cyclopentadiene in 65 ccm. of absolute tetrahydrofurane is added dropwise to this suspension while stirring vigorously and with exclusion of air and moisture. The solution becomes dark brown in color with heating. When the reaction is completed, the mixture is heated to boiling point for about 2 hours and then the reaction mixture is worked up as described in Example 1. Finally, the 4-methyl-6,8-diphenyl azulene is obtained in the form of a very viscous oil which is dark blue in color, this oil solidifying in vitreous form after being further purified by sublimation. It does not form any molecular compound with trinitrobenzene. Molecular weight: found 277, calculated 284. The yield is 15.3 g., which is 54% of the theoretical. The light absorption of the 4-methyl-6,8-diphenyl azulene shows inter alia strong maxima at 678, 590 and 569 (m$\mu$).

Example 3

60 g. of 2,4,6-trimethyl pyrylium perchlorate are added in small portions under pure nitrogen while stirring vigorously to 300 ccm. of a 1.9 molar solution of sodium cyclopentadiene in tetrahydrofurane in such a way that the reaction temperature does not rise over 45–50° C. After the addition the stirring is continued for 15 minutes. Then about ⅔ of the tetrahydrofurane are distilled off. The residue is diluted with water and several times submitted to extraction with petrol ether in order to isolate the azulene formed. The combined petrol ether extracts are washed with water and dried over calcium chloride. Thereafter the solvent is distilled off and the residue, a deep-violet oil, is distilled in a high vacuum. After a small fraction of products boiling below 90° C. the 4,6,8-trimethylazulene distills over at 90–100° C. and solidifies in the receiver. After recrystallization from ethanol the 4,6,8-trimethylazulene is obtained in the form of violet-black crystals, having the melting point of 81–82° C. The melting point of the trinitrobenzolate is 173–174° C.

Example 4

22.2 g. of 2,4,6-trimethyl pyrylium perchlorate are suspended in 100 ccm. of abs. tetrahydrofurane under pure nitrogen while stirring. The solution is cooled down to −18° C. 53 ccm. of a 1.9 molar solution of sodium cyclopentadiene in tetrahydrofurane are added dropwise in such a way that the temperature does not exceed −15° C. The solution of the perchlorate becomes momentarily violet when the drops enter. The color immediately changes over blue and green to yellow-red when the addition of the solution of sodium cyclopentadiene is interrupted. After the addition is completed the solution is nearly colorless. Then 250 ccm. of a 1-molar solution of potassium-tertiary-butylate in tertiary butanol are added; during this time the temperature must not rise above −10° C. After stirring for about 10 hours, whereby the temperature of the reaction mixture slowly rises to room-temperature, the reaction mixture is worked up as described in Example 3.

4,6,8-trimethylazulene is obtained in a yield of 55–60% of the theoretical.

Example 5

10 g. of 2.6-dimethyl-4-tertiary-butyl-pyrylium perchlorate are added under pure nitrogen while stirring vigorously to 100 ccm. of a 1-molar solution of sodium cyclopentadiene in tetrahydrofurane. The whole quantity of the perchlorate is added at once. The violet reaction solution is heated to boiling for one hour, then diluted with 100 ccm. of water and extracted several times with petrol ether. The combined petrol ether extracts are shaken with sulfuric acid of a 60% strength. The sulfuric acid solution thus obtained is extracted twice with petrol ether in order to remove the unreacted cyclopentadiene, then poured in ice-water. The separated azulene is taken up in petrol ether. The petrol ether solution is washed well and dried over calcium chloride. After distilling off the solvent, a blue-violet oil remains which is stirred up with a small quantity of ethanol while cooling with a mixture of ice and sodium chloride. The oil solidifies slowly with the formation of crystals. After recrystallization from ethanol the 4.8-dimethyl-6-tertiary-butyl-azulene is obtained in the form of violet-black crystals melting at 33–34° C. The yield amounts to 80% of the theoretical. The melting point of the trinitrobenzolate is 160–161° C.

The 4.8-dimethyl-6-tertiary-butyl-azulene shows in its spectrum in the visible range the following absorption maxima: 644 (132), 585 (379), 562 (419), 546 (449) m$\mu$ ($\epsilon$).

Example 6

20 ccm. of a 2-molar solution of sodium cyclopentadiene in tetrahydrofurane are added under pure nitrogen while stirring vigorously to a suspension of 5 g. of 2.6-dimethyl-4-phenyl-pyrylium perchlorate in 30 ccm. of absolute tetrahydrofurane. The reaction mixture changes its colour to deep-blue while its temperature rises strongly. The reaction solution is heated under reflux for one hour and worked up as described in Example 5. The 4.8-dimethyl-6-phenyl-azulene is purified by sublimation in a high vacuum and forms light-blue crystals melting at 100–101° C. The yield amounts to 87% of the theoretical. The 4.8-dimethyl-6-phenyl azulene shows in its spectrum in the visible range the following absorption maxima: 663 (130), 604 (375), 564 (445) m$\mu$ ($\epsilon$).

Example 7

Starting with 2.6-dimethyl-4-methoxy-pyrylium perchlorate and sodium cyclopentadiene and working according to the method described in Example 4, the 4.8-dimethyl-6-methoxyazulene is obtained forming red needles melting at 100–101° C. The yield amounts to 48% of the theoretical. The melting point of the trinitrobenzolate is 126–127° C.

The 4.8-dimethyl-6-methoxy-azulene shows in its spectrum in the visible range the following absorption maxima: 605 (88), 515 (341) m$\mu$ ($\epsilon$).

*Example 8*

Equimolar quantities of 2.4.6-trimethyl pyrylium perchlorate and of sodium-methyl-cyclopentadiene are reacted according to the method described in Example 4. The reaction solution obtained is worked up as described in Example 5. The impure azulene thus obtained is distilled with water vapor. From the distillate thus obtained the 2.4.6.8-tetramethyl-azulene is obtained in the form of violet needles melting at 100–101° C. The yield amounts to 27% of the theoretical. The melting point of the trinitrobenzolate is 211–212° C.

The 2.4.6.8.-tetramethyl-azulene shows in its spectrum in the visible range the following absorption maxima: 626 (121), 608 (165), 558 (358) m$\mu$ ($\epsilon$).

What we claim is:

1. A method of producing azulenes which comprises reacting a member of the group consisting of the alkali and the alkaline earth metal compounds of a cyclopentadiene which is substituted by hydrogen in at least one position adjacent to the CH$_2$-group with a pyrylium salt so as to form a fulvene and subjecting the fulvene thus formed to a temperature of about 0° C. to about 100° C.

2. A method of producing azulenes which comprises reacting a member of the group consisting of the alkali and the alkaline earth metal compounds of a cyclopentadiene which is substituted by hydrogen in at least one position adjacent to the CH$_2$-group with a pyrylium salt so as to form a fulvene and subjecting the fulvene thus formed to a temperature of about 40° C. to about 100° C.

3. A method of producing azulenes which comprises reacting a member of the group consisting of the alkali and the alkaline earth metal compounds of a cyclopentadiene which is substituted by hydrogen in at least one position adjacent to the CH$_2$-group with a pyrylium salt which is substituted in the pyrylium ring system by at least one substituent of the group consisting of the alkyl-, aryl- and alkoxy-groups so as to form a fulvene and subjecting the fulvene which is initially formed to a temperature of about 0° C. to about 100° C.

4. A method of producing azulenes which comprises reacting a member of the group consisting of the alkali and the alkaline earth metal compounds of a cyclopentadiene which is substituted by hydrogen in at least one position adjacent to the CH$_2$-group with a pyrylium salt which is substituted in the pyrylium ring system by at least one substituent of the group consisting of the alkyl-, aryl- and alkoxy-groups so as to form a fulvene and subjecting the fulvene thus formed to a temperature of about 40° C. to about 100° C.

5. A method of producing azulenes which comprises adding a solution of a member of the group consisting of the alkali and the alkaline earth metal salts of a cyclopentadiene which is substituted by hydrogen in at least one position adjacent to the CH$_2$-group to a suspension of a pyrylium salt which is substituted in the pyrylium ring system by at least one substituent of the group consisting of the alkyl-, aryl- and the alkoxy-groups, using anhydrous tetrahydrofurane as solvent and suspension agent and subjecting the fulvene which is initially formed to a temperature of about 0° C. to about 100° C.

6. A method of producing azulenes which comprises adding a solution of a member of the group consisting of the alkali and the alkaline earth metal salts of a cyclopentadiene which is substituted by hydrogen in at least one position adjacent to the CH$_2$-group to a suspension of a pyrylium salt which is substituted in the pyrylium ring system by at least one substituent of the group consisting of the alkyl-, aryl- and the alkoxy-groups, using anhydrous tetrahydrofurane as solvent and suspension agent and subjecting the fulvene which is initially formed to a temperature of about 40° C. to about 100° C.

7. A process of producing azulenes, which process comprises reacting a member of the group consisting of the alkali metal compounds and the alkaline earth metal compounds of a cyclopentadiene substituted by hydrogen in at least one position adjacent to the CH$_2$-group, with a pyrylium salt so as to form a fulvene, and subjecting the fulvene thus formed to a temperature between about 20° C. and about 100° C.

8. A process of producing azulenes, which process comprises adding a solution of a member of a group consisting of the alkali metal salts and the alkaline earth metal salts of a cyclopentadiene substituted by hydrogen in at least one position adjacent to the CH$_2$-group to a suspension of a pyrylium salt, using anhydrous tetrahydrofurane as solvent and suspending agent and subjecting the fulvene initially formed thereby to a temperature between about 20° C. and about 100° C.

References Cited in the file of this patent

UNITED STATES PATENTS

| | | |
|---|---|---|
| 2,766,304 | Ziegler et al. | Oct. 9, 1956 |
| 2,804,485 | Ziegler et al. | Aug. 27, 1957 |
| 2,805,266 | Ziegler et al. | Sept. 3, 1957 |